United States Patent [19]
Takamori et al.

[11] 4,067,835
[45] Jan. 10, 1978

[54] GLASS FIBER SIZING AGENT

[75] Inventors: Shigeru Takamori, Osaka; Yoshinao Kono; Hirotaka Takemoto, both of Wakayama, all of Japan

[73] Assignee: Kao Soap Co., Ltd., Tokyo, Japan

[21] Appl. No.: 749,222

[22] Filed: Dec. 10, 1976

[30] Foreign Application Priority Data

Dec. 23, 1975 Japan .................................. 50-153617

[51] Int. Cl.$^2$ ........................ C08L 67/08; C08L 67/06
[52] U.S. Cl. ............................. 260/22 R; 260/29.2 E; 260/29.6 PM; 427/390 A; 428/392
[58] Field of Search ........ 260/29.2 E, 22 R, 29.6 PM; 427/390 A; 428/392

[56] References Cited

U.S. PATENT DOCUMENTS

| 3,262,809 | 7/1966 | Aber ................................. 260/29.2 E |
| 3,310,512 | 3/1967 | Curtice ............................. 260/29.2 E |
| 3,763,064 | 10/1973 | Soliday ........................... 260/29.2 E |
| 3,920,596 | 11/1975 | Furukawa et al. ................. 260/22 R |
| 3,923,708 | 12/1975 | Furukawa et al. ................. 260/22 R |
| 4,009,132 | 2/1977 | Furukawa et al. ................. 260/22 R |

Primary Examiner—Ronald W. Griffin
Attorney, Agent, or Firm—Blanchard, Flynn, Thiel, Boutell & Tanis

[57] ABSTRACT

A glass fiber sizing agent comprising, as a sizing component, an oil-in-water emulsion of a saturated polyester which is formed by emulsifying in water, a saturated polyester obtained by reacting, under heating, (a) an aromatic or saturated aliphatic dicarboxylic acid or lower alkyl ester thereof, (b) a diol component containing at least 40 mole %, based on the total diol component, of an adduct of 2 to 10 moles of an alkylene oxide to 2,2-bis(4-hydroxyphenyl)propane, and (c) 5 to 30 parts by weight, per 100 parts by weight of the sum of the starting components (a) and (b), of an emulsifier selected from the group consisting of an adduct of 10 to 200 moles of ethylene oxide to castor oil, an adduct of 10 to 200 moles of ethylene oxide to hardened castor oil and a polyethylene glycol having an average molecular weight of 1000 to 6000.

7 Claims, No Drawings

GLASS FIBER SIZING AGENT

BACKGROUND OF THE INVENTION

1. Field of the Invention

The present invention relates to a glass fiber sizing agent that is used for the surface treatment of glass fibers, which glass fibers are to be utilized for the manufacture of glass fiber reinforced plastics (sometimes hereinafter referred to as FRP).

2. Description of the Prior Art

Unsaturated polyester resins and epoxy resins are usually employed as thermosetting matrix resins in glass fiber reinforced plastics. The impregnating property, wetting property and adhesiveness of the matrix reins to glass fibers have great effects on the moldability of the glass fiber reinforced plastics and the quality of the final molded articles. The surface treatment of the glass fibers is very important for improving the impregnating property and the wetting property of the matrix resins.

In connection with the transparency of the final molded articles, the so-called opacity phenomenon readily occurs because of peeling of some of the glass fibers from the matrix resin and the molded articles often become opaque. Sometimes this opacity phenomenon is caused by a difference of the refractive index.

It is a primary object of the present invention to provide a glass fiber sizing agent capable of giving fiber reinforced plastics (FRP) wherein the glass fibers are bonded tightly to the matrix resin, occurrence of the opacity phenomenon is prevented, the impregnating and wetting properties of the matrix resin to the glass fibers are highly improved and yellowing does not take place at all.

The glass fiber sizing agents conventionally used in the art include polyvinyl acetate emulsions, aqueous solutions of polyvinyl alcohol and compositions containing a resin such as an unsaturated polyester or a saturated polyester, a lubricant and a polymerizable organic silane compound or a polymerizable organic chromium compound.

Polyvinyl acetate emulsions, aqueous solutions of polyvinyl alcohol and saturated polyesters are nonreactive to the glass fibers and are inferior in the glass fiber-bonding property. Accordingly, when these resin components are employed as sizing agents, the opacity phenomenon readily occurs. In contrast, when an unsaturated polyester resin is used as the resin component of the sizing agent, because this resin has reactivity with the glass fibers, the opacity phenomenon scarcely occurs. Especially, a sizing agent comprising as the main component an unsaturated polyester of the bisphenol type has excellent wetting and impregnating properties, in addition to the above advantage that the opacity phenomenon does not occur. However, a sizing agent of this type is defective because yellowing of the resulting FRP readily occurs.

Although the sizing agent of the present invention is of the saturated polyester type, because an alkylene oxide adduct of 2,2-bis(4-hydroxyphenyl)propane, i.e., an alkylene oxide of bisphenol A, is employed as the starting diol, by virtue of the inherent excellent mechanical properties of the bisphenol A structure, the opacity phenomenon does not occur at all in the resulting FRP.

SUMMARY OF THE INVENTION

In accordance with the present invention, there is provided a glass fiber sizing agent for the surface treatment of glass fibers which are to be used for the reinforcement of unsaturated polyester resins, which comprises, as a film-forming substance, an oil-in-water emulsion of a saturated polyester which is formed by emulsifying in water, a saturated polyester obtained by reacting, under heating, (a) an aromatic or saturated aliphatic dicarboxylic acid or lower alkyl ester thereof, (b) a diol component containing at least 40 mole %, based on the total diol component, of an adduct of 2 to 10 moles of an alkylene oxide to 2,2-bis(4-hydroxyphenyl)propane, and (c) 5 to 30 parts by weight, per 100 parts by weight of the sum of the starting components (a) and (b), of an emulsifier selected from the group consisting of an adduct of 10 to 200 moles of ethylene oxide to castor oil, an adduct of 10 to 200 moles of ethylene oxide to hardened castor oil and a polyethylene glycol having an average molecular weight of 1000 to 6000. The glass fiber surface treating agent usually contains, in addition to said emulsion, a lubricant and a coupling agent. The lubricant and coupling agent can be any of the lubricants and coupling agents conventionally used for treating glass fibers and they can be used in the conventional amounts.

As the aromatic dicarboxylic acid that is used in the present invention, there can be mentioned, for example, phthalic acid, isophthalic acid, terephthalic acid, phthalic anhydride and naphthalene-dicarboxylic acid. In addition, lower alkyl ($C_1$ to $C_4$) esters of these dicarboxylic acids, i.e., lower alkyl esters of aromatic dicarboxylic acids, such as dimethyl phthalate, 4-methyl isophthalate, dimethyl terephthalate and dimethyl 2,6-naphthalene-dicarboxylate, can be used. As the aliphatic saturated dicarboxylic acid, there can be used, for example, succinic acid, adipic acid, hexahydrophthalic acid and sebacic acid.

In the present invention, an adduct of 2 to 10 moles of an alkylene oxide to bisphenol A must comprise at least 40 mole % of the total diol component. As the alkylene oxide, it is preferred to use ethylene oxide and propylene oxide. As the polyol component that can be used in combination with this alkylene oxide adduct, there can be mentioned, for example, ethylene glycol, propylene glycol, diethylene glycol, triethylene glycol, dipropylene glycol, neopentyl glycol, hydrogenated bisphenol A, 1,3-butane diol and 1,4-butane diol. Further, polyols having three or more hydroxyl groups, such as glycerin, trimethylol propane and pentaerythritol, can be used in combination with the alkylene oxide adduct of bisphenol A employed as the critical diol component.

In the present invention, there is used an emulsifier selected from the group consisting of an adduct of 10 to 200 moles of ethylene oxide to castor oil, an adduct of 10 to 200 moles of ethylene oxide to hardened castor oil and a polyethylene glycol having an average molecular weight of 1,000 to 6,000. Most emulsifiers of this type are bonded to the interior or terminals of the polyester. In other words, they are emulsifiers of the so-called bonded or internal type. When the emulsion stability is low, an external (or non-bonded) emulsifier may be used in combination with the internal emulsifier. Non-ionic and cationic surface active agents are principally used as the external emulsifiers, but anionic surface active agents also can be employed. For example, polyoxyethylene alkyl ethers, polyoxyethylene alkyl phenol ethers, quaternary ammonium salts, polyoxyethylene sorbitan fatty acid esters and polyvinyl alcohol are preferably employed as external emulsifiers.

The emulsion is prepared by emulsifying the thus-prepared polyester in water. The emulsion usually contains from 1 to 40 weight percent of said polyester. The glass fiber surface treating agent preferably contains a lubricant and a coupling agent and more water so that said agent usually contains from 0.2 to 2 weight percent of said polyester.

Lubricants that can be effectively used in the present invention are known lubricants for glass fiber surface treating compositions. For example, there can be used animal and marine oils and waxes such as carnauba wax and candelilla wax, silicon oils such as dihydrocarbonpolysiloxanes, polyhydric alcohols such as glycerin and polyethylene glycol, esters of polyhydric alcohols such as esters of diethylene glycol and polyethylene glycol, aliphatic alcohols such as lauryl alcohol and stearyl alcohol, and aliphatic amides such as pelargone amide and polyvalent unsaturated aliphatic acid amides insolubilized by an acid anhydride.

It is preferred that in the glass fiber sizing agent, the amount of the lubricant is from 1 to 10 parts by weight, per 100 parts by weight of the bisphenol type saturated polyester employed as the film-forming substance.

Coupling agents that can be effectively used in the glass fiber surface treating agent of the present invention are known coupling agents. For example, there can be employed silane compounds such as vinyl triethoxysilane, vinyl triacetoxysilane, allyltrichlorosilane, aminosilane, epoxysilane, γ-methacryloxypropyl trimethoxysilane, vinyl trisiloxane and allyl polysiloxane, and coordination compounds of an organic carboxylic acid and trivalent chromium such as chromic methacrylate chloride. The amount of the coupling agent is from 1 to 40 parts by weight, per 100 parts by weight of said saturated polyester. It is preferable that acetic acid is added to the glass fiber sizing agent. Acetic acid is intended to promote the hydrolysis of a coupling agent such as a silano-compound.

The present invention will now be described in detail by reference to the following illustrative examples.

EXAMPLE 1

A four-neck flask equipped with an agitator, a thermometer, a nitrogen-introducing tube and a water-removing tube was charged with 350 g (1.0 mole) of an adduct of 2.0 moles of propylene oxide to bisphenol A, 118 g (1.0 mole) of succinic acid, 140.4 g of polyethylene glycol (having an average molecular weight of 1,000) and 0.3 g of hydroquinone as a polymerization inhibitor. A dehydration esterification reaction was carried out at 180° to 200° C for 11 hours in a nitrogen gas current and there was obtained a polyester having an acid value of 20, a softening point of 39° C and an average molecular weight of 1,820. A 10 wt.% oil-in-water emulsion was prepared by emulsifying this polyester in water.

Using the thus-prepared emulsion, a sizing agent having the following composition was prepared as a glass fiber surface treating agent:

| | |
|---|---|
| 10% Polyester emulsion | 50 parts by weight |
| γ-Methacryloxypropyl trimethoxysilane | 0.3 part by weight |
| Fatty acid amide (Silasol 185A, product of ICI) | 0.2 part by weight |
| Acetic acid | 0.1 part by weight |
| Water | balance |
| Total | 100 parts by weight |

Glass cloth, which has not been subjected to any surface treatment, was dipped in the thus-prepared glass fiber surface treating agent, and then, the glass cloth was dried by hot air. The amount of the treating agent applied to the glass cloth was 0.81 wt.%.

A glass cloth-reinforced unsaturated polyester laminate of a 5-layer structure (having a glass content of 5 to 30 wt.%) was prepared by using the thus-treated glass cloth. The resin used was Epolac N-350L manufactured by Nippon Shokubai (of the isophthalic acid type). Room temperature curing was conducted for 20 to 30 minutes by using a curing agent of the cobalt naphthenate-methylethyl ketone peroxide. A good wetting and impregnating state was maintained during the laminating step. The laminate was subjected to the post-curing treatment at 100° C for 2 hours. The resulting laminate was colorless and excellent in transparency. The opacity phenomenon, i.e., the phenomenon that glass fibers are seen embossed, was not observed at all in the resulting laminate.

EXAMPLE 2

In the same manner as described in Example 1, 668 g (1.0 mole) of an adduct of 10 moles of ethylene oxide to bisphenol A, 148 g (1.0 mole) of phthalic anhydride, 81.6 g of an adduct of 100 moles of ethylene oxide to castor oil and 0.25 g of tertiary butyl catechol as a polymerization inhibitor were charged and reacted at 145° to 200° C for 9 hours to obtain a polyester having an acid value of 18, a softening point of 53° C and an average molecular weight of 2,110. A 10% oil-in-water emulsion was prepared from this polyester.

A sizing agent having the following composition was prepared as a glass fiber surface treating agent using the above emulsion as the base:

| | |
|---|---|
| 10% Polyester emulsion | 50 parts by weight |
| Vinyl tris-β-methoxyethoxysilane | 0.3 part by weight |
| Fatty acid amide (Silasol 185A, product of ICI) | 0.08 part by weight |
| Acetic acid | 0.1 part by weight |
| Water | balance |
| Total | 100 parts by weight |

Glass cloth, which had not been subjected to any surface treatment, was dipped in the above surface treating agent in the same manner as described in Example 1, and was dried by hot air. A glass cloth-reinforced polyester 5-layer laminate was prepared by using the thus-treated glass cloth. The unsaturated polyester and curing conditions were the same as those used in Example 1.

Good wetting and impregnating states were maintained during the laminating step. The laminate was subjected to post-curing treatment at 100° C for 2 hours. The resulting laminate was colorless and excellent in the transparency, and no opacity phenomenon of glass fibers was observed at all.

EXAMPLE 3

In the same manner as described in Example 1, 158 g (0.5 mole) of an adduct of 2 moles of ethylene oxide of bisphenol A, 45 g (0.5 mole) of 1,4-butane diol, 154 g (1.0 mole) of hexahydrophthalic anhydride, 107 g of an adduct of 50 moles of ethylene oxide to hardened castor oil and 0.3 g of hydroquinone as a polymerization inhibitor were charged and the esterification reaction was carried out at 145° to 200° C for 10 hours to obtain a polyester having an acid value of 21, a softening point of 48° C and an average molecular weight of 1,540. A 10% oil-in-water emulsion was prepared from this polyester.

A sizing agent having the following composition was prepared as a glass fiber surface treating agent from the thus-prepared emulsion:

| | |
|---|---|
| 10% Polyester emulsion | 50 parts by weight |
| γ-Methacryloxypropyl trimethoxysilane | 0.3 part by weight |
| Fatty acid amide (Silasol 185A, product of ICI) | 0.08 part by weight |
| Acetic acid | 0.1 part by weight |
| Water | balance |
| Total | 100 parts by weight |

In the same manner as described in Example 1, glass cloth, which had not been subjected to any surface treatment, was dipped in the above surface treating agent and dried by hot air. A glass cloth-reinforced polyester laminate having a 5-layer structure was prepared by using the thus-treated glass cloth.

A good wetting and impregnating state was attained during the laminating step. The laminate was subjected to the post-curing treatment at 100° C for 2 hours. The resulting laminate was colorless and excellent in the transparency, and no opacity phenomenon was observed at all in this laminate.

REFERENTIAL EXAMPLE 1

In the same manner as described in Example 1, 668 g (1.0 mole) of an adduct of 10 moles of ethylene oxide to bisphenol A, 98.1 g (1.0 mole) of maleic anhydride, 153 g of an adduct of 100 moles of ethylene oxide to castor oil and 0.23 g of tertiary butyl catechol as a polymerization inhibitor were charged and reacted at 145° to 200° C for 9.5 hours to obtain a polyester having an acid value of 22, a softening point of 38° C and an average molecular weight of 1970. A 10% oil-in-water emulsion was prepared from the thus-prepared polyester.

A sizing agent having the following composition was prepared as a glass fiber surface treating agent using the above emulsion as the base:

| | |
|---|---|
| 10% Polyester emulsion | 50 parts by weight |
| Vinyl tris-β-methoxyethoxysilane | 0.3 part by weight |
| Fatty acid amide (Silasol 185A, product of ICI) | 0.08 part by weight |
| Acetic acid | 0.1 part by weight |
| Water | balance |
| Total | 100 parts by weight |

In the same manner as described in Example 1, glass cloth, which had not been subjected to any surface treatment, was dipped in the above treating agent and was dried by hot air. A glass cloth-reinforced unsaturated polyester laminate of a 5-layer structure was prepared by using the thus-treated cloth.

A good wetting and impregnating state was attained during the laminating step. The laminate was subjected to the post-curing treatment at 100° C for 2 hours. Yellowing occured in the post-cured laminate, but the opacity phenomenon was not observed.

REFERENTIAL EXAMPLE 2

In the same manner as described in Example 1, 76 g (1 mole) of propylene glycol, 154 g (1 mole) of hexahydrophthalic anhydride, 69 g of an adduct of 50 moles of ethylene oxide to hardened castor oil and 0.25 g of hydroquinone as a polymerization inhibitor were charged and the esterification reaction was carried out at 145° to 200° C for 10 hours to obtain a polyester having an acid value of 19, a softening point of 40° C and an average molecular weight of 2,100. A 10% oil-in-water emulsion was prepared from this polyester.

A sizing agent having the following composition was prepared using the thus prepared emulsion as a base:

| | |
|---|---|
| 10% Polyester emulsion | 50 parts by weight |
| Vinyl triethoxysilane | 0.3 part by weight |
| Fatty acid amide (Silasol 185A, product of ICI) | 0.08 part by weight |
| Acetic acid | 0.1 part by weight |
| Water | balance |
| Total | 100 parts by weight |

In the same manner as described in Example 1, glass cloth, which had not been subjected to any surface treatment, was dipped in the above surface treating agent and was dried by hot air. A glass cloth-reinforced unsaturated polyester laminate having a 5-layer structure was prepared by using the thus-treated glass cloth.

The wetting and impregnating state was a little worse than in the case of the sizing agent of the present invention. The laminate was subjected to the post-curing treatment as 100° C for 2 hours. The opacity phenomenon occurred and glass fibers were seen embossed.

The embodiments of the invention in which an exclusive property or privilege is claimed are defined as follows:

1. A composition useful for sizing glass fibers, comprising an oil-in-water emulsion obtained by emulsifying in water a saturated film-forming polyester prepared by reacting, under polyester-forming conditions, (a) an aromatic or saturated aliphatic dicarboxylic acid or lower alkyl ester thereof, (b) a diol component consisting of from 40 to 100 mole % of an adduct of 2 to 10 moles of an alkylene oxide to 2,2-bis(4-hydroxyphenyl)-propane and from zero to 60 mole % of a different polyester-forming polyol, and (c) from 5 to 30 parts by weight, per 100 parts by weight of the sum of (a) and (b), of an emulsifier selected from the group consisting of an adduct of 10 to 200 moles of ethylene oxide to castor oil, an adduct of 10 to 200 moles of ethylene oxide to hardened castor oil and polyethylene glycol having an average molecular weight of from 1000 to 6000.

2. A composition as claimed in claim 1 in which said aromatic dicarboxylic acid is selected from the group consisting of phthalic acid, isophthalic acid, terephthalic acid, phthalic anhydride, naphthalene dicarboxylic acid and lower alkyl esters thereof and said saturated aliphatic dicarboxylic acid is selected from the group consisting of succinic acid, adipic acid, hexahydrophthalic acid, sebacic acid and lower alkyl esters thereof.

3. A composition as claimed in claim 1 in which said different polyester-forming polyol is selected from the group consisting of ethylene glycol, propylene glycol, diethylene glycol, triethylene glycol, dipropylene glycol, neopentyl glycol, hydrogenated bisphenol A, 1,3-butanediol, 1,4-butanediol, glycerin, trimethylol propane, pentaerythritol and mixtures thereof.

4. A composition as claimed in claim 1 containing from 1 to 30 parts by weight of a lubricant for glass fibers, per 100 parts by weight of said polyester.

5. A composition as claimed in claim 4 containing from 1 to 40 parts by weight of a coupling agent for glass fibers, per 100 parts by weight of said polyester.

6. A glass fiber reinforcing material coated with a composition as claimed in claim 1 as a sizing composition.

7. A glass fiber reinforced plastic article comprising glass fiber reinforcing material as claimed in claim 6 in a matrix of an unsaturated polyester resin.

* * * * *